United States Patent [19]
Lambiris

[11] 3,889,984
[45] June 17, 1975

[54] INTEGRAL KEY-CLAMP FOR EXHAUST PIPES

[75] Inventor: Theodore Lambiris, West Bloomfield, Mich.

[73] Assignee: General Motors Corporation, Detroit, Mich.

[22] Filed: Aug. 5, 1974

[21] Appl. No.: 494,503

[52] U.S. Cl. ............... 285/27; 24/277; 285/322; 285/330; 285/420
[51] Int. Cl. ............................................ F16l 21/06
[58] Field of Search ....... 285/27, 24, 420, 253, 199, 285/252, 330, 322; 24/277

[56] References Cited
UNITED STATES PATENTS

| | | | |
|---|---|---|---|
| 2,377,060 | 5/1945 | White | 285/27 X |
| 2,449,735 | 9/1948 | Wyss | 285/27 X |
| 3,178,208 | 4/1965 | Koehler | 285/420 X |
| 3,222,090 | 12/1965 | Powers et al. | 285/27 |
| 3,521,911 | 7/1970 | Hanes et al. | 285/27 |
| 3,729,782 | 5/1973 | Downing | 24/277 |

Primary Examiner—Thomas F. Callaghan
Attorney, Agent, or Firm—Arthur N. Krein

[57] ABSTRACT

An integral key-clamp for exhaust pipes wherein a male pipe is connected to a female pipe having a notch extending axially inboard from its mating end, the male pipe having a key fixed on the outer peripheral surface thereof and to the inboard side wall of the saddle element of a saddle clamp assembly used to secure the two pipes together. The saddle of the saddle clamp is normally spaced from the outer peripheral surface of the male pipe a suitable distance to permit the female pipe to telescope over the end of the male pipe and under the saddle so that the notch on the female pipe engages the key on the male pipe.

4 Claims, 4 Drawing Figures

PATENTED JUN 17 1975 3,889,984

INTEGRAL KEY-CLAMP FOR EXHAUST PIPES

The use of key joints to effect alignment of connecting male and female conduits, such as connecting exhaust pipes of automotive vehicles, to effect proper routing of these conduits is well known. Conventionally, such a key joint is provided by means of one or more locating keys or tabs, on the exterior of a male pipe, which are received in one or more notches or slots extending axially in the mating end of a female pipe, each key or tab and their mating notch or slot being properly angularly positioned on the respective pipes prior to assembly of these pipes.

Such prior art key joints, as used, for example, on vehicle exhaust pipes, normally provide proper angular alignment of the connecting exhaust pipes relative to each other and with respect to other surrounding vehicle components. However, when using such a prior art key joint, it is sometimes possible for the female exhaust pipe to overrun the locator key on the male exhaust pipe so that proper angular alignment may not be obtained between these pipes. For example, in a service repair shop, in cases when damage occurs in any way to the mating end of the female exhaust pipe, this end of the pipe may be "resized" on a mandrel with the result that the diameter of this mating end of the pipe becomes oversized to an extent to permit it to overrun the locating key on the male pipe. When this occurs, the locating key on the male pipe may not be in axial alignment with the slot in the female pipe so that, in effect, the female pipe may be rotated either clockwise or counterclockwise relative to the locating tab on the male pipe thereby adversely affecting the angular orientation or location of these and other connected exhaust system component parts with respect to each other and with respect to other surrounding vehicle components.

It is therefore a primary object of this invention to improve a key joint for connecting conduits, such as exhaust pipes, whereby a locating key is fixed to both a male conduit and to a saddle clamp used to clamp the female conduit to a male conduit so that a slot in the female conduit can be positively engaged by the locating key.

Another object of this invention is to provide an improved key joint arrangement for connecting conduits, such as exhaust connector pipes, in a vehicle exhaust system whereby a locating key integral with one of the pipes and a saddle clamp is used to effect proper axial and angular orientation of these exhaust pipes with respect to each other and with respect to other surrounding vehicle components.

These and other objects of the invention are obtained by means of an integral key-clamp for exhaust pipes, or similar conduits, telescopically interconnected and held together by a saddle clamp, wherein a locating key or tab is fixed, for example, to a male exhaust pipe and to the saddle of the saddle clamp, whereby this key is positioned to engage into an axially directed slot opening in a female exhaust pipe.

For a better understanding of the invention, as well as other objects and further features thereof, reference is had to the following detailed description of the invention to be read in connection with the accompanying drawings, wherein.

Figure 1:
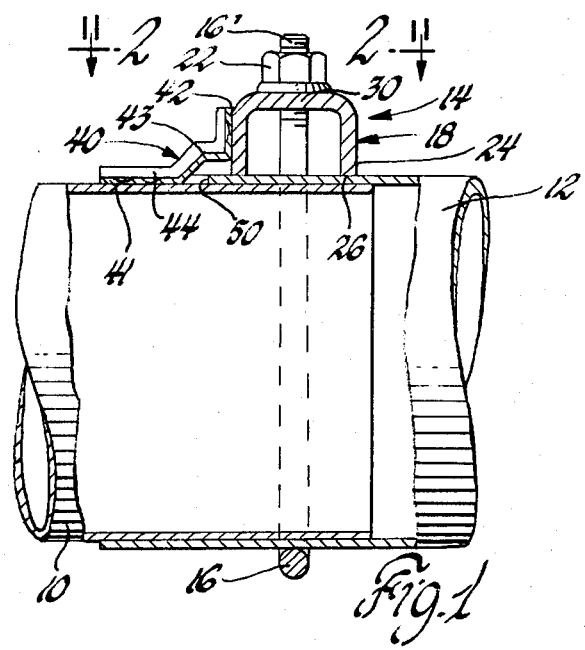
FIG. 1 is a side, elevational, partially broken view of an integral key-clamp, in accordance with this invention, used to connect together a pair of exhaust pipes as, for example, in an automotive vehicle.
Figure 2:
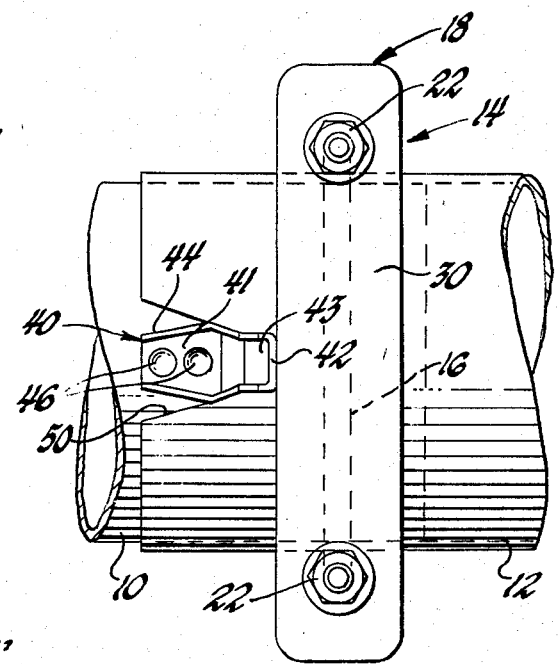
FIG. 2 is a view taken along line 2—2 of FIG. 1.
Figure 3:
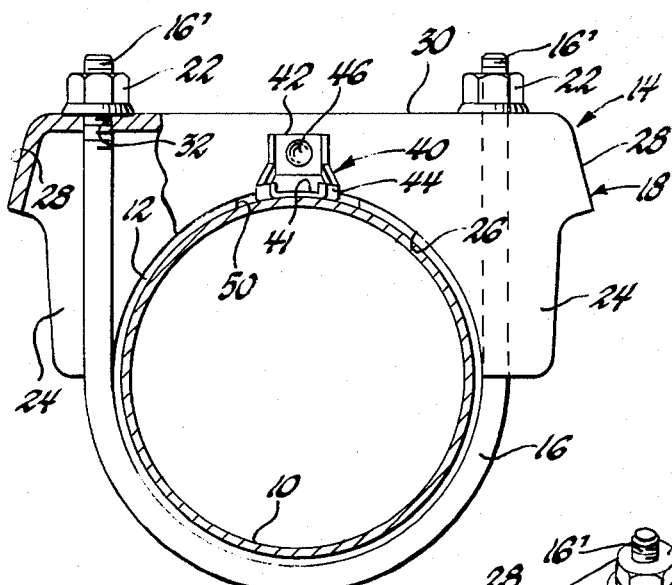
FIG. 3 is a view taken along line 3—3 of FIG. 2.
Figure 4:
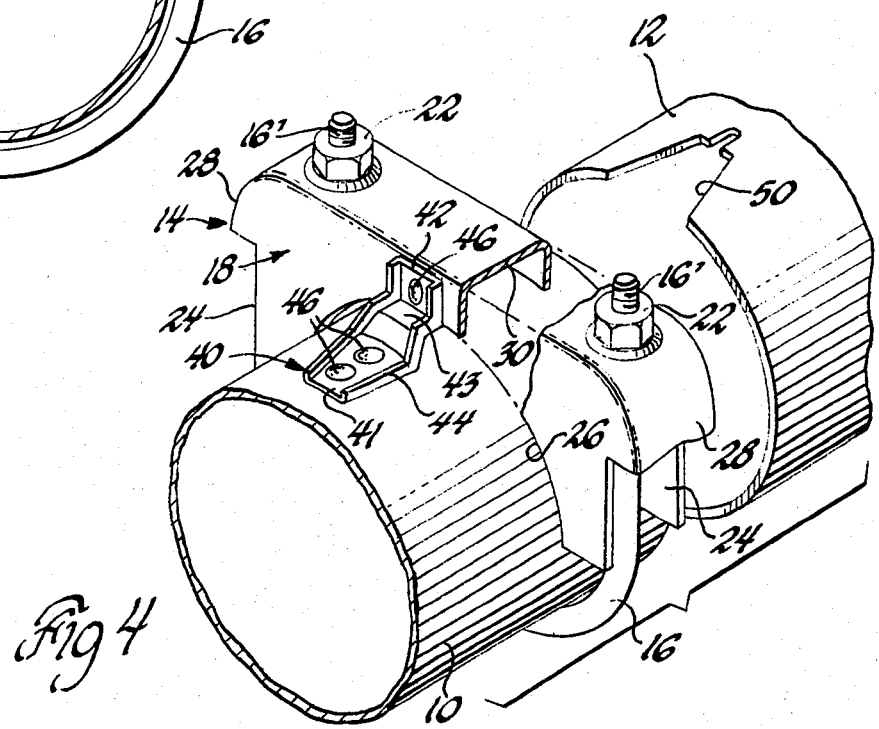
FIG. 4 is an exploded, perspective view of the structure of FIG. 1.

For purposes of describing the invention only, the conduits shown in the drawings will be referred to as exhaust pipes of the type used in the exhaust system to an automotive vehicle to convey the discharged products of combustion from the internal combustion engine of the vehicle. In addition, it should also be realized that, although the conduits will be referred to as exhaust pipes, one or the other of the exhaust pipes of the hereinafter described pair of exhaust pipes may actually be the conduit-like coupling end or muffler pipe stub of an exhaust muffler, for example.

Referring now to the drawings, there is shown a pair of telescopically connected exhaust pipes, including a male pipe 10 and a female pipe 12 held securely together by a saddle clamp, generally designated 14.

The saddle clamp 14 includes a U-bolt 16 having threaded extremities 16', a saddle, generally designated 18, having apertures through which the extremities 16' of the U-bolt 16 extend to threadingly receive the washer based nuts or flange nuts 22. The saddle 18, which in the embodiment illustrated is substantially U-shaped, is provided with a pair of parallel, spaced apart side walls 24, each having a curved, free edge whereby these side walls define a pair of spaced arcuate seats, designated 26, of a curvature for peripherally engaging a portion on the exterior of the female pipe 12, a pair of end walls 28 and a planar integral top wall 30, with reference to the drawings, the top wall 30 being provided with apertures 32 to receive the threaded extremities 16' of the U-bolt 16. As is well known, the U-bolt 16 can be moved from a position relative to the saddle 18 in which it would loosely encircle the female pipe 12 to a clamp-up position relative to the saddle 18 whereby this clamp assembly is constricted about the female pipe 12.

Referring now to the subject matter of the invention, a locating key or tab, generally designated 40, extends from a side wall 24 of the saddle 18 and is fixed to the outer peripheral surface of the male pipe 10 a predetermined distance from its mating end. Preferably, the locating key or tab 40 extends from the inboard side wall 24 of the saddle 18, with respect to the mounting position of the saddle 18 on the male pipe 10, that is, the left-hand side wall 24 as seen in FIG. 1.

The locating key or tab 40 may be formed integral with the saddle 18 or, as shown, it may be formed as a separate element fixed to the inboard side wall 24 of the saddle, that is, to the left-hand side wall 24 as seen in FIG. 1. In the embodiment illustrated, the locating key or tab 40 is formed as a sheet metal stamping with a pipe base 41 formed with a bottom surface shaped complementary to the outer periphery of the male pipe 10 for engagement with the exterior of the male pipe 10, a saddle base 42 for engagement with side wall 24 of the saddle 18 at right angle to pipe base 41 and a stepped portion 43 interconnecting the bases 41 and 42, the outer edges of the pipe base 41, stepped portion 43 and saddle base 42 terminating in upstanding flanges 44 which serve to strengthen this element and to increase the effective female pipe 12 engaging height of pipe base 41, especially if the key or tab 40 is made of relatively this sheet metal.

Whether the locating key or tab 40 is made as an integral part of the saddle or as a separate element, as shown, suitably fixed to the saddle 18, as by welding or by the rivet 46, as shown, the pipe base 41 of the tab 40 should extend a predetermined distance raidally outward from the arcuate seats 26 formed by the side walls 24 of the saddle 18 whereby, with the pipe base 41 suitably fixed to male pipe, as by welding or, as shown, by the rivets 46, the seat 26 of saddle 18 is spaced from the male pipe 10 a sufficient distance, a distance at least equal to the wall thickness of the female pipe 12, to allow the female pipe 12 to be telescopically connected to the male pipe 10 with the female pipe 12 passing over the male pipe 10 and under the saddle 18 when the U-bolt 16 is loosely secured relative to the saddle 18.

The female pipe 12 at its mating end is provided with a suitable shaped slot or notch 50 formed complementary to that portion of the key or tab 40 with which it engages to effect angular orientation of the female pipe 12 relative to the male pipe 10, the slot or notch 50, in the embodiment shown, being V-shaped to conform to the outboard converging sides of the stepped portion 43 of the key or tab 40.

To describe by way of an example the orientation of the key or tab 40 on the male pipe 10 and the slot 50 on the female pipe 12, we can assume that the male pipe 10 serves as a muffler pipe stub at the rear end of a muffler in a vehicle exhaust system and the female pipe 12 is a tail pipe. As is well known, the muffler would be secured at a predetermined position on the vehicle for desired orientation with respect to other vehicle components, as by support brackets, not shown, fixed at one end to the saddle 18 of clamp 14 or directly to the muffler housing, not shown, and at its other end to a cross member of the vehicle frame, not shown, since they form no part of the subject invention.

The key or tab 40 on the male pipe 10, serving as a muffler pipe stub, would be formed in proper angular orientation to a desired reference point on the muffler, not shown, and therefore orientated relative to a fixed reference point, for example, on the vehicle frame. The slot or notch 50 would also be formed on the female pipe 12 in the desired angular orientation to, for example, a bend or curve in this pipe, not shown, whereby it will pass around or over a vehicle component, not shown, as this pipe 12 is orientated off the male pipe 10. Thus, with the muffler mounted on the frame and with the key or tab 40 engaged in the slot or notch 50 of the female pipe 12, the female pipe 12 will be properly angularly orientated with respect to the male pipe so that the bend or curve in the female pipe will pass around or over a vehicle component.

It should be realized that, in the above described example, the female pipe 12 could, if desired, serve as the muffler pipe stub.

What is claimed is:

1. A male pipe, female pipe and clamp assembly including, a female pipe having a generally axially directed slot opening through the wall thereof extending from one end thereof, a male pipe having one end telescopically received in said female pipe a first predetermined axial distance, a clamp encircling the female pipe, said clamp including a U-bolt means and a saddle in engagement with said U-bolt means, a key means fixed at one end to said saddle and at its other end to said male pipe, said key means being fixed to said male pipe a second predetermined axial distance inboard of said one end of said male pipe, said key means being slidably received in said slot opening in said female pipe whereby said female pipe is fixed against rotation relative to said male pipe and fastener means associated with said U-bolt means and said saddle for constricting said clamp around said female pipe.

2. A male pipe, female pipe and clamp assembly according to claim 1 wherein said key means supports said saddle radially outward from said male pipe a sufficient distance whereby said female pipe is telescopically received over said male pipe and under said saddle and wherein said first predetermined axial distance is greater than said second predetermined axial distance.

3. A male pipe, female pipe and clamp assembly including, a female pipe having a slot opening in the wall thereof extending generally axially from one end thereof, a male pipe having one end telescopically received within said one end of said female pipe, a key means fixed at one end to said male pipe on the exterior thereof projecting into said slot opening in said female pipe, of clamp encircling said one end of said female pipe with said male pipe telescoped therein, said clamp including a U-bolt means and a saddle in engagement with said U-bolt means, said saddle including parallel spaced apart side walls each having an arcuate shaped free edge to form a seat for the exterior of said female pipe, said key means being fixed at its opposite end to one of said side walls of said saddle and, fastener means associated with said U-bolt means and said saddle for constricting said clamp around said female pipe.

4. An integral key-clamp assembly for securing a male pipe to a female pipe, said female pipe having a generally axially directed slot opening through its wall at one end thereof receiving an end of the male pipe, said integral key-clamp assembly including a U-bolt having threaded extremities, a channeled saddle having a top wall apertured at opposite ends to receive said threaded extremities, said channeled saddle further having spaced apart side walls integral with said top wall and extending downwardly therefrom to define a pair of spaced arcuate seats for peripherally engaging said female pipe with which it is associated, a key means fixed at one end to one of said side walls, the opposite end of said key means being fixed to the exterior of said male pipe, said opposite end extending at right angle from said one of said side walls in spaced radial relation relative to said arcuate seat defined by said one of said side walls a sufficient distance so that with said opposite end of said key means fixed to the exterior of said male pipe the said arcuate seats will be spaced from said male pipe whereby said male pipe can be telescopically received within said female pipe with said female pipe passing over said male pipe and under said channeled saddle and, a clamping nut threadedly connected to each of said threaded extremities above said top wall of said saddle.

* * * * *